Oct. 5, 1971

H. J. GERBER 3,610,081

AUTOMATIC SHEET MATERIAL CUTTER WITH CUTTING
TOOL ANGLE CHECKING MEANS

Filed Feb. 9, 1970

INVENTOR
HEINZ JOSEPH GERBER

BY McCormick, Paulding & Huber
Attorneys

United States Patent Office 3,610,081
Patented Oct. 5, 1971

3,610,081
AUTOMATIC SHEET MATERIAL CUTTER WITH CUTTING TOOL ANGLE CHECKING MEANS
Heinz Joseph Gerber, West Hartford, Conn., assignor to Gerber Garment Technology, East Hartford, Conn.
Filed Feb. 9, 1970, Ser. No. 9,569
Int. Cl. B26d 5/30
U.S. Cl. 83—62
8 Claims

ABSTRACT OF THE DISCLOSURE

An automatically controlled cutter for cutting sheet material, such as layups of garment fabrics, includes a cutter which is driven in two coordinate directions relative to the material being cut in order to follow a desired line of cut. The cutting tool is a reciprocating blade which is automatically rotated about its cutting axis in order to maintain it tangent to the line of cut at all points therealong. To prevent injury to the material being cut in the event the cutting blade is not positioned tangentially to the line of cut, the device includes an encoder for measuring its actual angular position. The signal produced by this encoder is compared with another derived tool angle signal obtained from the signals used to move the cutter along the line of cut. If the actual tool angle signal does not agree favorably within certain predetermined limits with the derived tool angle signal a stop signal is produced which inhibits further cutting of the material by the cutter.

BACKGROUND OF THE INVENTION

This invention relates to automatically controlled devices for cutting sheet material, such as layups of fabric, and deals more particularly with such a system including a monitoring mechanism for terminating active cutting of the material by the blade in the event the blade departs substantially from a position of tangency with respect to the line of cut being followed.

In the past, various different devices have been proposed and used for cutting sheet material, such as fabric layups, by means of a cutter the operation of which is controlled by an automatic controller operating in response to input information supplied thereto by punched paper tape or the like. In such devices, the movement of the cutter relative to the sheet material being cut is controlled by the automatic controller so that the cutting tool of the cuter follows a desired line of cut located in the plane of the sheet material. This may be accomplished by holding the sheet material stationary and moving the cutter in two coordinate directions relative to such material, by moving the cutter relative to the sheet material in only one coordinate direction and moving the sheet material relative to the cutter in the other coordinate direction, or by holding the cutter stationary and moving the sheet material in both of the two coordinate directions. In any event, the cutting tool used with the cutter is commonly a reciprocating knife blade, a reciprocating jig-saw blade, a unidirectionally moving band blade with a knife or saw edge, or other similar blade having a forward cutting edge extending along a cutting axis arranged generally perpendicular to the sheet material and having a substantial thickness or dimension in the direction extending rearwardly from the cutting edge. Accordingly, in order to obtain proper cutting of the sheet material, it is necessary that as such cutting tool is moved along a given line of cut that its angular position relative to the cutting axis be varied with changes in the slope of the line in order to maintain the blade tangent to the line of cut and its cutting edge aimed directly forwardly along such line. If the cutting tool is not properly oriented angularly relative to the line of cut a proper cut will not be obtained and severe damage may be caused to both the cutter and the material being cut. In many cases, the material being cut is of very great value so that any injury caused to it as by allowing the device to operate with the cutting tool positioned at the wrong angle could cause severe financial loss.

The general object of this invention is, therefore, to provide a cutting tool angle checking mechanism in an automatically controlled sheet material cutter of the foregoing character which inhibits operation of the cutter in the event the cutting tool becomes accidentally or inadvertently oriented at the wrong cutting angle, thereby preventing damage to the cutter and the material being cut and relieving the operator from the necessity of keeping a close visual check on the blade angle.

SUMMARY OF THE INVENTION

The present invention resides in an automatically controlled sheet material cutter including a monitoring mechanism for inhibiting operation of the cutter in the event the cutting tool of the cutter departs from a tangent relationship to the line of cut being followed. More particularly, the automatic cutting device includes a cutter having a cutting tool which is driven in two coordinate directions in the plane of the material, to follow a desired line of cut, by command signals from an associated automatic controller. This controller also supplies command signals in response to which the blade is rotated about its cutting axis. Connected with the two signals used to drive the cutter along the desired line of cut is a means, such as an analog computing circuit, for producing a signal representative of the slope angle of the line of cut dictated by such drive signals, and connected with the cutting tool is an encoder for producing a signal representative of the actual angle of the cutting tool about its cutting axis. These two latter signals are compared in a comparator which produces a stop signal inhibiting further cutting operation in the event the difference between the two signals exceeds a predetermined limit.

DETAILED DESCRIPTION OF THE PREFERRED EMBODIMENT

Figure 1:
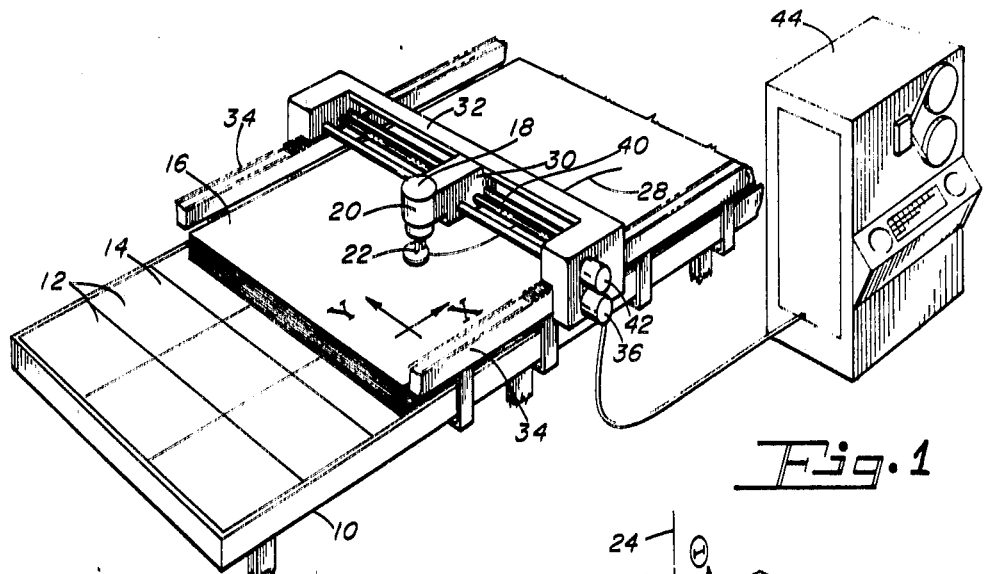
FIG. 1 is a perspective view showing an automatically controlled sheet material cutter embodying the present invention.

An automatically controlled cutter to which the blade angle checking means of this invention is applied may take various different forms, and one such form is, by way of example, shown in FIG. 1. Referring to this figure, the automatically controlled cutter shown therein comprises a table 10 having a bed comprised of blocks 12, 12 of foamed plastic material, such as foamed polyethylene sold under the trade name Ethafoam by Dow Chemical Company, providing an upwardly facing flat surface 14 for receiving and supporting sheet material to be cut in a spread condition. As shown, this sheet material comprises a layup 16 consisting of a large number of individual layers of fabric such as cloth used for making garments, upholstery or the like.

Associated with the table 10 is a cutter 18 consisting of a cutter head 20 and a cutting tool 22. The cutter 18 is of the reciprocating type with the cutting tool 22 being in the form of a knife blade reciprocated along its cutting axis, the cutting axis being arranged generally perpendicular to the material 16. The cutting tool is shown more clearly in FIG. 2 wherein the line 24 indicates its cutting axis. The tool is sharpened along its forward edge portion to form a sharp cutting edge 26 and, as shown, it has a substantial dimension in the direction rearwardly of the cutting edge 26. The cutter head 20 of the cutter 18 includes both a motor for reciprocating the cutting tool 22 along its cutting axis 24, to cause it to cut the material 16 as it is moved in the plane thereof, and another motor for rotating the cutter tool 22 about its cutting axis 24, the cutter head further including suitable means for supporting the blade to enable such rotation about the cutting axis as it is simultaneously reciprocated along such axis. Such means are well known in the art and therefore are not shown herein in detail, however, by way of example the cutter 18 could be one generally similar to the one shown in U.S. Pat. No. 3,477,322.

Figure 2:
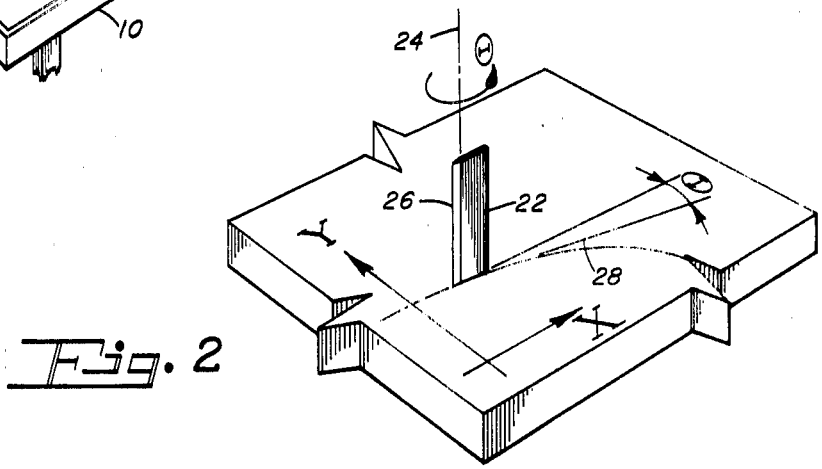
FIG. 2 is an enlarged perspective view showing a portion of the cutting tool of the device of FIG. 1 and a part of the material being cut thereby.

In FIGS. 1 and 2, the line 28 indicates the line of cut on the material 16 being followed by the cutter 18. It will, of course, be understood that during a cutting operation the cutting tool 22 extends through the thickness of the material 16 and is reciprocated up and down along its cutting axis 24 as the cutter is moved in the plane of the material 16. The lower end of the cutting tool may and preferably does, at least during a portion of its stroke, penetrate and extend some distance into the supporting bed formed by the foamed plastic blocks 12, 12. FIG. 1 shows the cutter 18 and its cutting tool 22 in a normal active cutting position, and from this position, the entire cutter 18 may be moved upwardly to bring the cutting tool out of the material 16 to allow the cutter to be moved relative to the cloth to various different positions without cutting the cloth even though the tool may be reciprocated during such movement.

Movement of the cutter 18 in two coordinate directions relative to the material 16 is effected by mounting it on a sub-carriage 30 carried by a main carriage 32. The main carriage 32 straddles the table 10 and is movable relative thereto in the illustrated X coordinate direction, the supporting means for the main carriage 32 including two elongated racks 34, 34 on either side of the table which cooperate with associated pinions (not shown) carried by the carriage 32 driven by an associated motor 36. The sub-carriage 30 is movable in the illustrated Y coordinate direction relative to the main carriage 32 and is driven in such direction by a lead screw 40 powered by an associated motor 42.

Operation of the motors 36 and 42 for driving the cutter 18 in the X and Y coordinate directions respectively is effected by command signals generated by an associated automatic controller 44 which may, for example, be a general purpose digital computer, or a special purpose numerical controller. The controller 44 also produces the required command signals for operating the drive motor, illustrated at 48 in FIG. 3, of the cutter head 20 for rotating the cutting tool about the cutting axis, and also generates other command signals (not shown) for controlling other functions of the cutting device such as the lifting of the cutter into and out of operative cutting relation with the material 16 and the starting and stopping of the motor for reciprocating the cutting tool.

Figure 3:
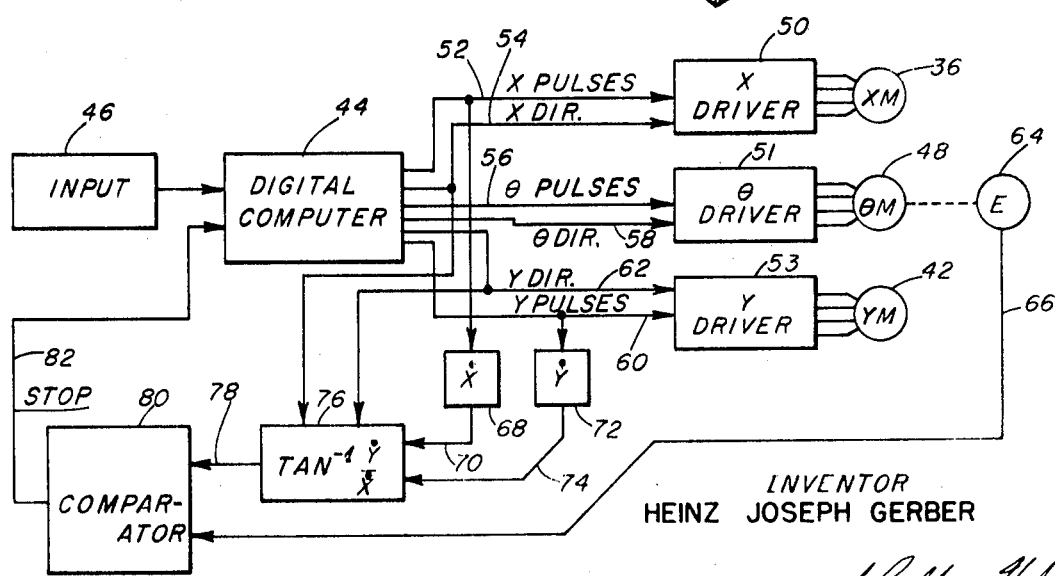
FIG. 3 is a schematic block diagram of the device of FIG. 1.

Turning now to FIG. 3, this figure is a schematic block diagram of the device of FIG. 1, and in referring to it, it will be noted that the controller 44 is there indicated to be a digital computer. Associated with this computer is an input device 46 which may take any conventional form, such as a punched paper tape reader, a magnetic tape reader or a card reader, for supplying information to the computer concerning the desired line to be followed. In response to this input information the computer in well known fashion operates to produce output command signals transmitted to the associated motors 36 and 42 to cause the cutter 18 to be driven along the desired line of cut and also to the motor 48 to rotate the cutter tool about its cutting axis. In the illustrated case, each of the motors 36, 42 and 48 is shown to be a stepping motor having associated therewith a driver 50, 51 or 53, respectively. Each of the motors and its associated driver is or may be of any well known construction and as is conventional each motor is operated in response to pulses supplied to its associated driver to cause it to move one increment of motion for each pulse in a direction dictated by an accompanying directional signal. For example, considering the X motor 36 and its driver 50, the driver 50 is connected to the computer 44 by two lines 52 and 54 on which appear a composite drive signal commanding movement of the cutter 18 in the X coordinate direction. This composite drive signal consists of a series of pulses appearing on the line 52 and a direction signal appearing on the line 54. The direction signal 54 conditions the driver 50 to cause energization of the windings of the motor 36 in one sequence or another to cause operation of the motor in either the forward or the reverse direction in response to received pulses, and the received pulses supplied by the line 52 each cause a step-wise change in the energization scheme of the windings of the motor to cause it to be moved one increment of motion in the direction dictated by the direction signal. Similarly, the driver 51 for the motor 48 is connected with the computer 44 through two lines 56 and 58 on which appear respectively pulses commanding movement of the motor 48 and a directional signal commanding the direction of the rotation effected by the pulses. Likewise the driver 53 of the motor 42 is connected to the computer 44 by two lines 60 and 62 on which respectively appear driving pulses and a direction signal.

From the foregoing description, it will therefore be understood that the command signals supplied to the X driver 50 and Y driver 53 operate the motors 36 and 42 to cause the cutter 18 to be driven along a desired line of cut such as the line 28 shown in FIGS. 1 and 2. At the same time, the command signals applied to the driver 51 operate the motor 48 to rotate the cutting tool 22 to maintain it tangent to the line 28 being followed. The command signals supplied to the driver 51 over the lines 56 and 58 may be obtained directly from the input device 46, or may be computed by the computer 44 from the information supplied by the input device 46 concerning the coordinates of the line to be followed. That is, in the first case, the input device 46 may provide specific instructions concerning the tool angle to be used at various points along the line of cut and the computer 44 may merely convert these tool angle instructions to the proper command signals supplied to the driver 51. On the other hand, in the second case, the input device 46 may supply no specific information concerning the tool angle and instead the computer may generate, from the information concerning the coordinates of the line 28 to be followed, the slope of such line at various different points and from such slope information derive the command signals supplied to the driver 51 required to maintain the cutter tool tangent to the line.

Regardless of the manner in which the tool angle commands signals for the driver 51 are generated, it is possible that the tool may accidentally become oriented at an improper angle about its cutting axis. For example, in the case where the input device supplies direct instructions concerning the tool angle, such instructions may be incorrect, and in cases where the command signals for the tool angle motor are derived from the coordinates of the line being followed, the program used for generating such signals through the operation of the computer may be faulty.

In order to avoid any damage or injury to the material 16 being cut, or to the cutter itself, as a result of an improper tool angle, the device of this invention, as shown best in FIG. 3, includes a means for checking the actual angular position of the cutting tool relative to the slope angle of the line being followed and for inhibiting further cutting operation in the event such two angles are different from one another by more than a predetermined amount. As shown in FIG. 3, this means includes an encoder 64 connected with the drive motor 48 used to rotate the cutter tool 22 about its cutting axis. The encoder 64 therefore produces a signal on the associated line 66 representing the actual angular position of the cutting tool 22 about the cutting axis. A derived tool angle signal is also produced and is obtained from the command signals supplied to the drivers 50 and 53 for causing movement of the cutter 18 along the desired line of cut. The means for producing this derived signal in the illustrated case includes a first analog circuit 68 connected with the line 52 and operable to produce on its own output line 70 a signal directly related to the repetition rate of the pulses appearing on the line 52. The signal on the line 70 is therefore a signal directly related to the speed of movement of the cutter head in the X coordinate direction. Similarly, associated with the line 60 is analog circuit 72 which produces on its output line 74 a signal directly related to the repetition rate of the pulses appearing on the line 60 and therefore directly related to the velocity of the cutter 18 in the Y coordinate direction.

The two velocity related signals appearing on the lines 70 and 74 are transmitted to another analog function computing circuit 76 also having as inputs thereto the X direction signal appearing on the line 54 and the Y direction signal appearing on the line 62. The analog computing circuit 76 computes the function arc tangent $\dot{Y}/\dot{X}$, which will be recognized as the slope angle of the line of cut being instantaneously followed by the cutter 18.

The output signal representing this derived angle appears on the line 78 and is transmitted to a comparator 80 along with the actual tool angle signal appearing on the line 66. The comparator 80 compares the derived tool angle signal appearing on the line 78 with the actual tool angle appearing on line 66 and operates when such two signals differ from one another by more than a predetermined amount to produce a stop signal appearing on its output line 82. The stop signal, in turn, is used to inhibit further cutting operation of the cutter 18. This may be accomplished in various manners as, for example, using the stop signal 82 to produce a signal causing the cutting tool 22 to be withdrawn from the material 16. In the illustrated case, however, the stop signal appearing on the line 82 is transmitted to the computer 44 and the computer 44 is in turn so arranged or programmed as, in response to the appearance of the stop signal 82, to cease production of the command signals supplied to the drivers 50 and 53, thereby stopping movement of the cutter 18 along the line being followed. Preferably, although not shown, the computer also in response to the stop signal acts to terminate further reciprocative movement of the cutting tool along its cutting axis.

What is claimed is:

1. In a system for automatically cutting sheet material, the combination comprising means for supporting sheet material to be cut, a cutter movable relative to said supporting means in two coordinate directions so as to be capable of following a desired line of cut on the sheet material supported thereby, said cutter including a cutting tool having a cutting axis arranged generally perpendicular to the sheet material supported by said supporting means and rotatable about said cutting axis, an automatic controller for producing two drive signals respectively commanding movement of said cutter relative to said supporting means in said two coordinate directions and a third drive signal commanding movement of said cutting tool about said cutting axis, drive means connected with said controller and responsive to said two drive signals for moving said cutter along a line of cut dictated by said two drive signals and responsive to said third drive signal for rotating said cutting tool about said cutting axis to an angle dictated by said third signal, means responsive to said two drive signals for producing a derived tool angle signal representative of the slope angle of the line of cut dictated by said two drive signals, means connected with said cutting tool and responsive to the angular position of said tool about said cutting axis for producing an actual tool angle signal representative of the actual angular position of said cutting tool about said cutting axis, and means responsive to said derived tool angle signal and said actual tool angle signal for inhibiting cutting by said cutter of the sheet material supported by said supporting means when the difference between said derived tool angle signal and said actual tool angle signal exceeds a predetermined amount.

2. The combination defined in claim 1 further characterized by said means responsive to said derived tool angle signal and said actual tool angle signal for inhibiting cutting by said cutter of the sheet material supported by said supporting means when the difference between said derived tool angle signal and said actual tool angle signal exceeds a predetermined amount comprising a comparator for comparing said derived tool angle signal and said actual tool angle signal and for producing a stop signal when the difference between said derived tool angle signal and said actual tool angle signal exceeds said predetermined amount, and means for transmitting said stop signal to said automatic controller, said automatic controller being responsive to said stop signal to terminate the production of said two drive signals.

3. The combination defined in claim 1 further characterized by said drive means including a first stepping motor responsive to one of said two drive signals for moving said cutter in one of said two coordinate directions and a second stepping motor responsive to the other of said two drive signals for driving said cutter in the other of said two coordinate directions, each of said two drive signals including a series of pulses with the associated drive motor being responsive to each such pulse to move through one increment of motion, said means responsive to said two drive signals for producing a derived tool angle signal including two analog function computing circuits each responsive to a different one of said two series of pulses for producing an output signal directly related to the repetition rate of the associated series of pulses.

4. The combination defined in claim 3 further characterized by said means responsive to said two drive signals for producing a derived tool angle signal further including another analog computing circuit for computing the function arc tangent $\dot{Y}/\dot{X}$ where $\dot{X}$ is the output signal from the first of said two analog computing circuits and $\dot{Y}$ is the output signal of the other of said two analog computing circuits.

5. The combination defined in claim 1 further characterized by said cutting tool being a cutting knife reciprocative along said cutting axis and having a sharpened edge extending along said axis.

6. In a system for automatically cutting sheet material, the combination comprising means for supporting sheet material to be cut in a spread condition, a cutter having a cutter head and a cutting tool having a given cutting axis, means for mounting said cutter relative to said supporting means for movement of said cutter and said supporting means relative to one another in two coordinate directions to enable said cutter to follow a desired line of cut on sheet material supported by said supporting means and with said cutting axis arranged generally perpendicular to such sheet material, means supporting said cutting tool for movement about said cutting axis to enable it to be positioned tangent to said line of cut at all points therealong, an automatic controller for producing a first drive signal commanding movement of said cutter relative to said supporting means in the first of said two coordinate directions, for producing a second drive signal commanding movement of said cutter relative to said supporting means in the second of said two coordinate directions, and for producing a third drive signal commanding movement of said cutter tool about said cutting axis, first drive means connected with said controller and responsive to said first drive signal for moving said cutter and said supporting means relative to one another in said first of said two coordinate directions, second drive means connected with said controller and responsive to said second drive signal for moving said cutter and said supporting means relative to one another in said second of said two coordinate directions, third drive means connected with said controller and responsive to said third drive signal for rotating said cutting tool about said cutting axis, means connected with said controller and responsive to said first and second drive signals for producing from said first and second drive signals a derived tool angle signal representative of the angle of the line of cut dictated by said first and second drive signals, an encoder connected with said third drive means for producing an actual tool angle signal representative of the actual angular position of said cutting tool about said cutting axis, a comparator for comparing said derived tool angle signal with said actual tool angle signal and for producing a stop signal when the difference between said derived tool angle signal and said actual tool angle signal exceeds a predetermined amount, and means for inhibiting cutting by said cutter of the sheet material supported by said supporting means in response to the appearance of said stop signal.

7. The combination defined in claim 6 further characterized by said means for inhibiting cutting by said cutter of the sheet material supported by said supporting means in response to the appearance of said stop signal comprising means for transmitting said stop signal to said controller, said controller being operable in response to said stop signal to stop the production of said first and second drive signals.

8. The combination as defined in claim 7 further characterized by said first drive signal consisting of a first series of pulses and a first direction signal and said second drive signal comprising a second series of pulses and a second direction signal, said first drive means including a first stepping motor and an associated driver which driver is operable in response to said first series of pulses to cause movement of said first motor through one increment of motion for each pulse of said first series in a direction dictated by said first direction signal, said second drive means comprising a second stepping motor and an associated driver which latter driver is operable in response to said second series of pulses to cause movement of said stepping motor through one increment of motion for each pulse of said second series in a direction dictated by said second direction signal, and said means for producing a derived tool angle signal comprising an analog computing circuit for computing from said two series of pulses and from said two directional signals the function arc tangent $\dot{Y}/\dot{X}$ where $\dot{X}$ is the repetition rate of the pulses of said first series of pulses and $\dot{Y}$ is the repetition rate of the pulses of said second series of pulses.

References Cited
UNITED STATES PATENTS

| | | | |
|---|---|---|---|
| 1,172,059 | 2/1916 | Scheyer | 83—71 |
| 3,304,820 | 2/1967 | Muller et al. | 83—428 X |
| 3,511,124 | 5/1970 | Bruns | 83—559 X |
| 3,522,753 | 8/1970 | Schmied | 83—71 X |
| 3,533,320 | 10/1970 | Sederberg | 83—428 X |

WILLIAM S. LAWSON, Primary Examiner

U.S. Cl. X.R.

83—71

PO-1050
(5/69)

UNITED STATES PATENT OFFICE
CERTIFICATE OF CORRECTION

Patent No. 3,610,081      Dated October 5, 1971

Inventor(s) Heinz Joseph Gerber

It is certified that error appears in the above-identified patent and that said Letters Patent are hereby corrected as shown below:

Col. 1, line 49, "cuter" should be --cutter--.
    Col. 4, lines 62 and 63, "commands" should be --command--.
    Col. 8, line 13, following "of said" insert --second--.

Signed and sealed this 21st day of March 1972.

(SEAL)
Attest:

EDWARD M. FLETCHER, JR.      ROBERT GOTTSCHALK
Attesting Officer      Commissioner of Patents